United States Patent
Seshan et al.

(10) Patent No.: US 6,311,234 B1
(45) Date of Patent: Oct. 30, 2001

(54) DIRECT MEMORY ACCESS CONTROLLER WITH SPLIT CHANNEL TRANSFER CAPABILITY AND FIFO BUFFERING

(75) Inventors: Natarajan Seshan, Houston; Jeffrey R. Quay, Royse City; Kenneth L. Williams, Sherman; Michael J. Moody, McKinney, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/633,998

(22) Filed: Aug. 8, 2000

Related U.S. Application Data

(62) Division of application No. 09/054,833, filed on Apr. 3, 1998
(60) Provisional application No. 60/053,076, filed on Jul. 9, 1997, now Pat. No. 6,145,027.

(51) Int. Cl.[7] .............................. G06F 13/28; G06F 13/00; G06F 13/14; G06F 3/00
(52) U.S. Cl. ................... 710/22; 710/28; 710/35; 710/52
(58) Field of Search .................... 710/20, 22, 23, 710/28, 29, 35, 52, 56

(56) References Cited

U.S. PATENT DOCUMENTS

| | | | |
|---|---|---|---|
| 5,335,326 | * | 8/1994 | Nguyen et al. ............. 710/52 |
| 5,381,538 | * | 1/1995 | Amini et al. ................ 711/156 |
| 5,655,151 | * | 8/1997 | Bowes et al. ................ 710/22 |
| 5,732,223 | * | 3/1998 | Moore et al. ................ 710/52 |
| 5,765,023 | * | 6/1998 | Leger et al. ................. 710/22 |
| 5,828,856 | * | 10/1998 | Bowes et al. ................ 710/129 |
| 5,831,393 | * | 11/1998 | Hohenstein et al. ........ 714/52 |
| 5,974,486 | * | 10/1999 | Siddappa ..................... 710/53 |
| 6,081,854 | * | 6/2000 | Priem et al. ................. 710/37 |
| 6,167,465 | * | 12/2000 | Parvin et al. ................ 710/22 |
| 6,226,338 | * | 5/2001 | Earnest ........................ 375/372 |

* cited by examiner

Primary Examiner—Thomas Lee
Assistant Examiner—Tanh Q Nguyen
(74) Attorney, Agent, or Firm—Gerald E. Laws; W. James Brady, III; Frederick J. Telecky, Jr.

(57) ABSTRACT

A microprocessor 1 is described which includes a direct memory access (DMA) circuitry 143. DMA 143 is interconnected with a program memory 23 and a data memory 22 and is operational to transfer data to or from these memories. DMA 143 is interconnected with a peripheral bus 110 and thereby to various peripherals internal to microprocessor 1. DMA 143 is also interconnected with an external memory interface 103 and thereby to various external memory circuits and peripherals external to microprocessor 1. An auxiliary channel control circuitry 160 provides DMA transfers by interacting with a peripheral such as host port 150 which has its own address generation circuitry. DMA 143 provides frame synchronization for triggering a frame transfer, or group of transfers. DMA 143 is auto-initialized through registers. DMA action complete pins DMAC0–3 indicate DMA status to external devices. DMA 143 allows for local variability of transfer rates in a split channel mode of operation by allowing a transmit channel to get ahead of a corresponding receive channel by a preselected number of data words.

3 Claims, 9 Drawing Sheets

MEMORY MAP 0

| STARTING ADDRESS | | BLOCK SIZE (BYTES) |
|---|---|---|
| 000 0000 | EXTERNAL MEMORY SPACE CE0 | 16M |
| 100 0000 | EXTERNAL MEMORY SPACE CE1 | 4M |
| 140 0000 | INTERNAL PROGRAM RAM | 64K |
| 141 0000 | RESERVED | 4M |
| 180 0000 | INTERNAL PERIPHERAL SPACE | 4M |
| 1C0 0000 | RESERVED | 4M |
| 200 0000 | EXTERNAL MEMORY SPACE CE2 | 32M |
| 400 0000 | RESERVED | 1984M |
| 8000 0000 | INTERNAL DATA RAM | 64K |
| 8001 0000 | RESERVED | 4M |
| 8040 0000 | RESERVED | 2044M |
| 1 0000 0000 | | |

*FIG. 3A*

MEMORY MAP 1

| STARTING ADDRESS | | BLOCK SIZE (BYTES) |
|---|---|---|
| 000 0000 | INTERNAL PROGRAM RAM | 64K |
| 001 0000 | RESERVED | 4M |
| 040 0000 | EXTERNAL MEMORY SPACE CE0 | 16M |
| 140 0000 | EXTERNAL MEMORY SPACE CE1 | 4M |
| 180 0000 | SAME AS MEMORY MAP 0 | |
| 1 0000 0000 | | |

| 31 | 30 | 29 | 28 | 27 | 26 | 25 | 24 | 23 | | | | | | | 19 | 18 | | | 16 |
|----|----|----|----|----|----|----|----|----|---|---|---|---|---|---|----|----|---|---|----|
| DST RELOAD | | SRC RELOAD | | EMOD | FS | TCINT | PRI | WSYNC | | | | | | | | RSYNC | | | |
| RW, +0 | | RW, +0 | | RW, +0 | RW, +0 | RW, +0 | RW, +0 | RW, +0 | | | | | | | | RW, +0 | | | |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| RSYNC | WSYNC STAT | INDEX | CNT RELOAD | SPLIT | | ESIZE | | DST DIR | | SRC DIR | | STATUS | | START | |
| RW, +0 | RW, +0 | R, +0 | RW, +0 | RW, +0 | | RW, +0 | | RW, +0 | | RW, +0 | | R, +0 | | RW, +0 | |

FIG. 7

| 31 | | | | | | | | | | | | | 19 | 18 | 17 | 16 |
|----|---|---|---|---|---|---|---|---|---|---|---|---|----|----|----|----|
| reserved | | | | | | | | | | | | | | | DMAC EN | |
| R, +0 | | | | | | | | | | | | | | | RW, +0 | |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| WSYNC CLR | WSYNC STAT | RSYNC CLR | RSYNC STAT | DROP IE | WDROP COND | RDROP IE | RDROP COND | BLOCK IE | BLOCK COND | LAST IE | LAST COND | FRAME IE | FRAME COND | SX IE | SX COND |
| RW, +0 | RW, +0 | RW, +0 | RW, +0 | RW, +0 | RW, +0 | RW, +0 | RW, +1 | RW, +0 | RW, +0 | RW, +0 | RW, +0 | RW, +0 | RW, +0 | RW, +0 |

FIG. 8

| 31 | | | | 16 | 15 | | | | 0 |
|----|---|---|---|----|----|---|---|---|---|
| FRAME COUNT | | | | | ELEMENT COUNT | | | | |
| RW, +0 | | | | | RW, +0 | | | | |

FIG. 9

| 31 | | | | 16 | 15 | | | | 0 |
|----|---|---|---|----|----|---|---|---|---|
| FRAME COUNT RELOAD | | | | | ELEMENT COUNT RELOAD | | | | |
| RW, +0 | | | | | RW, +0 | | | | |

DIRECT MEMORY ACCESS CONTROLLER WITH SPLIT CHANNEL TRANSFER CAPABILITY AND FIFO BUFFERING

CROSS REFERENCE TO RELATED APPLICATIONS

This application is a divisional application of patent application Ser. No. 09/054,833, filed Apr. 3, 1998, which claims priority under 35 USC §119(e)(1) of Provisional Application No. 60/053,076, filed Jul. 9, 1997 now U.S. Pat. No. 6,145,027.

This application is related to co-assigned application Ser. No. 09/012,813 Ser. No. 08/974,742 Ser. No. 09/055,011 and U.S. Pat. No. 6,058,474 filed contemporaneously herewith and incorporated herein by reference.

TECHNICAL FIELD OF THE INVENTION

This invention relates to microprocessors, and particularly relates to microprocessors which include a direct memory access feature.

BACKGROUND OF THE INVENTION

Microprocessor designers have increasingly endeavored to improve performance in various microprocessors by increasing clock speeds and adding parallelism. Large blocks of random access memory (RAM) are included within the microprocessor for data storage and for program storage in order to reduce memory access times. Direct Memory Access (DMA) circuitry is often provided to transfer data between peripheral devices connected to a microprocessor and memory connected to the microprocessor. DMA circuitry is initialized and a DMA transfer operation monitored by software which operates on the microprocessor. DMA circuitry may provide one or more channels of independent control. A detailed description of a six channel DMA controller is contained in U.S. Pat. No. 5,305,446, issued to Leach et al, which is incorporated herein by reference, particularly with reference to FIGS. 10, 11, 12a and 12b.

An object of the present invention is to reduce the amount of initialization and monitoring required of software operating on the microprocessor for a given DMA transfer operation.

Another object of the present invention is to allow variable transfer rates for receive and write transfers.

SUMMARY OF THE INVENTION

In general, and in a form of the present invention, a microprocessor which has a central processing unit (CPU) and an internal memory, is further equipped with direct memory access (DMA) circuitry which is operable to transfer data from an external source of data to the internal memory. DMA interrupt circuitry interrupts the CPU in order to indicate transfer completion. A peripheral device within the microprocessor is provided with address generation circuitry for transferring data to or from the internal memory. An auxiliary channel control circuit is provided which causes data to be transferred to the internal memory using the address generation circuitry of the peripheral device and to interrupt the central processor using the DMA interrupt circuitry of the DMA controller.

In another aspect of the present invention, the DMA controller has programmable read address circuitry and programmable write address circuitry.

Another embodiment of the present invention has circuitry for performing split channel operation, operable to transmit data from a source address to a split destination address, and operable to coincidentally receive data from a split source address to a destination address.

Another embodiment of the present invention includes global data registers which can be used by the DMA controller for different functions on subsequent transfer operations.

Another embodiment of the present invention includes a floating FIFO buffer which can be connected between a selected source bus and a selected destination bus.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which:

FIGS. 3A and 3B illustrate two address maps used by the microprocessor of FIG. 1A;

FIG. 6 is an illustration of a DMA channel primary control register of the DMA controller of FIG. 4;

FIG. 7 is an illustration of a DMA channel secondary control register of the DMA controller of FIG. 4;

FIG. 8 is an illustration of a DMA channel transfer counter of the DMA controller of FIG. 4;

FIG. 9 is an illustration of a DMA global data register as used as transfer counter reload of the DMA controller of FIG. 4;

Corresponding numerals and symbols in the different figures and tables refer to corresponding parts unless otherwise indicated.

Detailed Description of Embodiments of the Invention

Figure 1A:
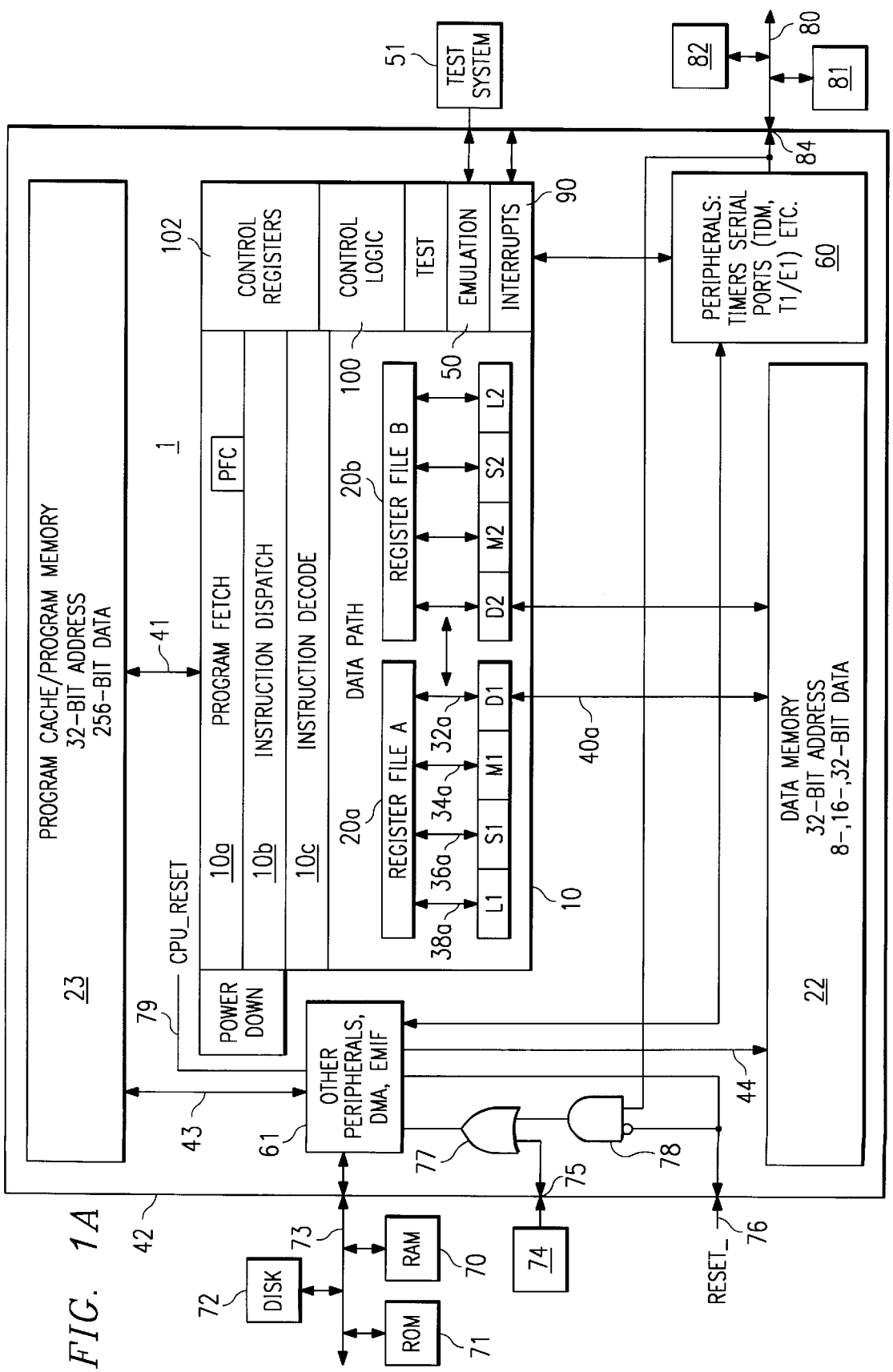
FIG. 1A is a block diagram of a microprocessor which has an embodiment of the present invention.

FIG. 1A is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail herein below, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Decoded instructions are provided from the instruction fetch/decode unit 10a–c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. Instructions are fetched by fetch unit 10a from instruction memory 23 over a set of busses 41. Emulation unit 50 provides access to the internal operation of integrated circuit 1 which can be controlled by an external test system 51.

Figure 1B:
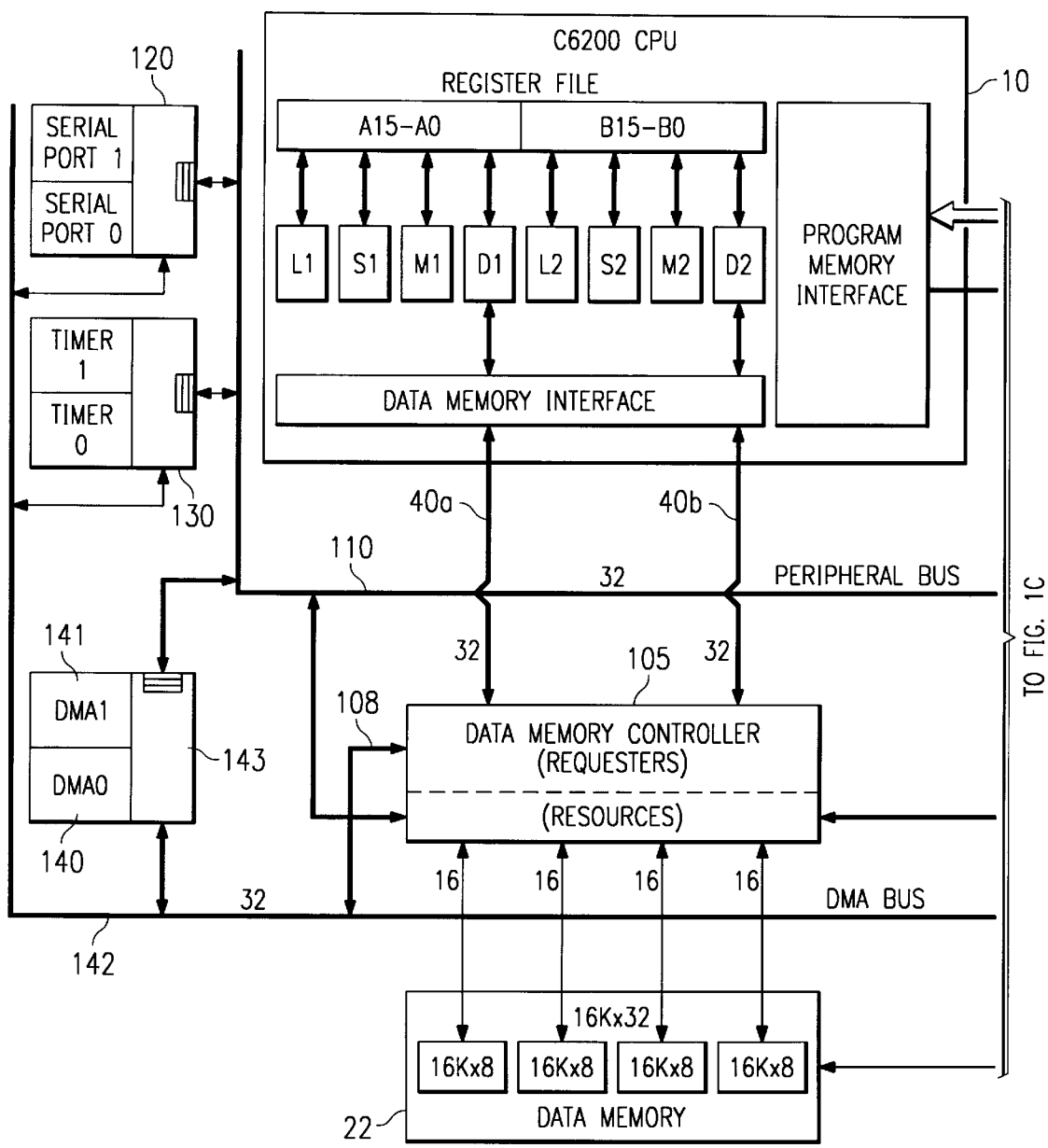
FIGS. 1B and 1C are a more detailed block diagram of the microprocessor of FIG. 1A.
Figure 1C:
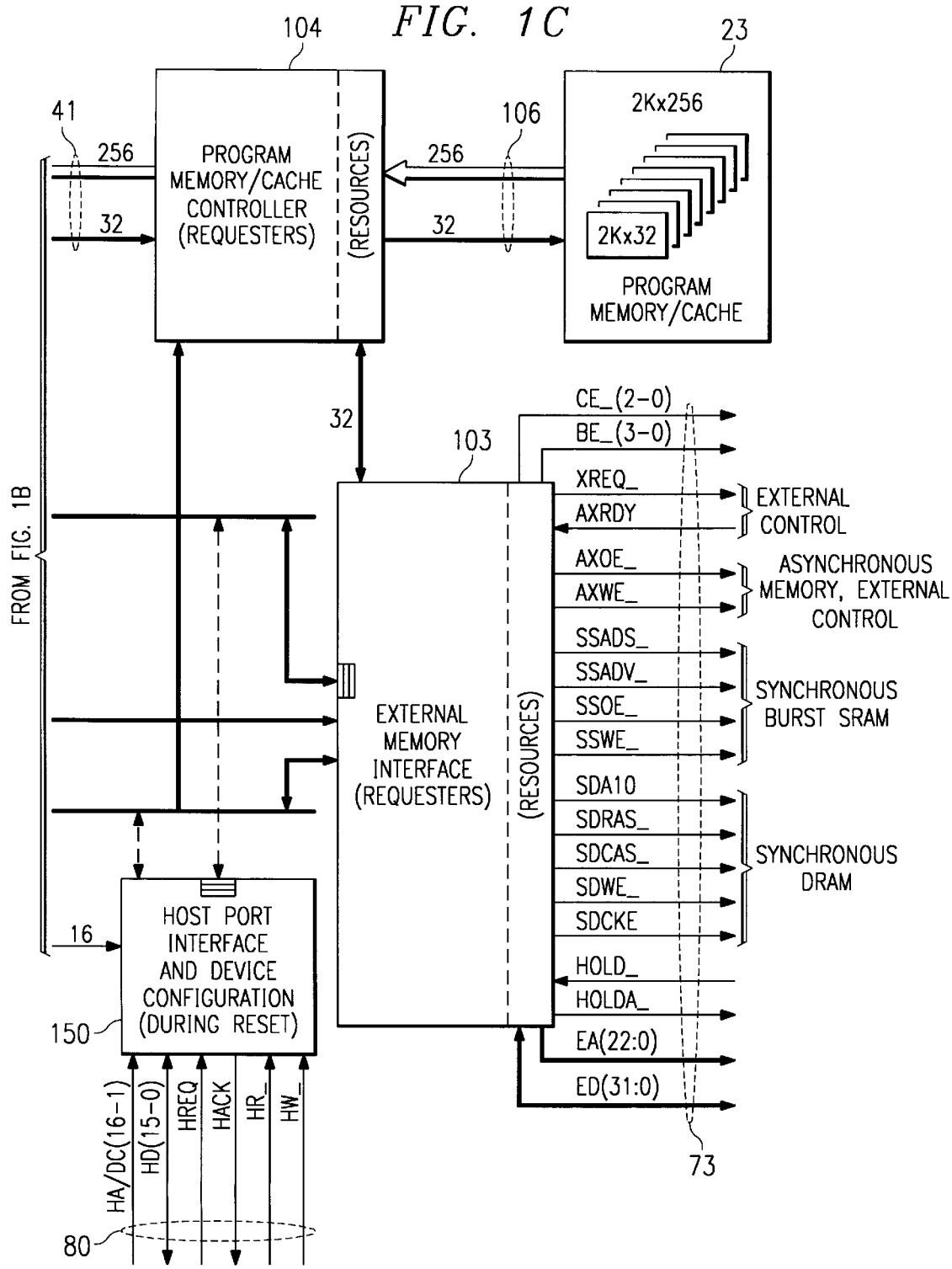

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. Also, an alternate number of execution units can be used.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. RAM 70 can be embodied in a number of ways, including: static RAM, (SRAM), dynamic RAM DRAM, synchronous DRAM (SDRAM) and burst static RAM (BSRAM), for example. Bus 73 is connected to an External Memory Interface (EMIF) which is part of functional block 61 within microprocessor 42. A Direct Memory Access (DMA) controller is also included within block 61. The DMA controller is generally used to move data between memory and peripherals within microprocessor 1 and memory and peripherals which are external to microprocessor 1. Data can be transferred from block 61 to program memory 23 via bus 43; data can be transferred to/from data memory 22 via bus 44. Other types of peripherals, such as timer 82, are connected via host port bus 80. A bus interface is contained within block 60 for host port bus 80.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features of the microprocessor of FIG. 1A is provided in co-assigned application Ser. No. 09/012,813 (TI docket number T-25311). A description of a complete set of instructions for the microprocessor of FIG. 1 is also provided in co-assigned application Ser. No. 09/012,813 (TI docket number T-25311).

According to an aspect of the present invention, the DMA controller in block 61 can be used to transfer a block of data from an external source to internal program memory 23 in response to reset signal 76. This block of data contains an initial program that can be executed by microprocessor 1 and may be a boot strap loader. A boot strap loader is used to load in a larger program for microprocessor 1. In either case, microprocessor 1 becomes operational without the need for a boot PROM or ROM within the microprocessor. This is advantageous because a PROM/ROM is relatively large and is typically used only for booting. Therefore, the space saved within microprocessor 1 by eliminating the need for a boot PROM/ROM can be advantageously used for more useful functions or the size of microprocessor 1 can be reduced in order to make a lower cost device.

Configuration circuitry 74 provides configuration parameters via interface pins 75 to block 61 for use in initializing the DMA controller. In an alternative embodiment, configuration circuitry 81 provides configuration parameters over bus 80 via interface pins 84 to block 61 for use in initializing the DMA controller. Block 77 provides an "OR" function so that configuration parameters from either circuitry 74 or 81 can be passed to block 61.

FIG. 1B is a more detailed block diagram of the microprocessor of FIG. 1A. Two DMA controllers are provided in block 61 for two separate DMA channels, DMA0 140 and DMA1 141. In the present embodiment, only DMA0 100 is configured to provide boot loading according to an aspect of the present invention, but this should not be considered a limiting constraint on the present invention. DMA controllers 140 and 141 are configured under program control by means of peripheral bus 110, which is connected via data bus 40b to CPU 10. DMA0 140 is operable to transfer data from an external source, such as ROM 71 in FIG. 1A to program memory 23 or data memory 22.

According to an aspect of the present invention, DMA0 140 is initialized to perform a boot load when reset signal 76 transitions from an asserted state to a deasserted state. Details of this initialization will be described later. After this initialization step, DMA0 140 begins requesting memory transfers. External memory interface (EMIF) 103 responds to a memory request from DMA0 140 via bus 142 and accesses data from a source on bus 73. After a data word is provided by EMIF 103, DMA0 140 transfers the data word to program memory controller 104 which then writes the data word into program memory 23 via bus 106 at an address designated by DMA0 140. During this boot load process, $CPU\_Reset\_$signal 79 is held in an asserted state by DMA0 140 so that no instruction processing is performed by CPU 10.

Figure 2:
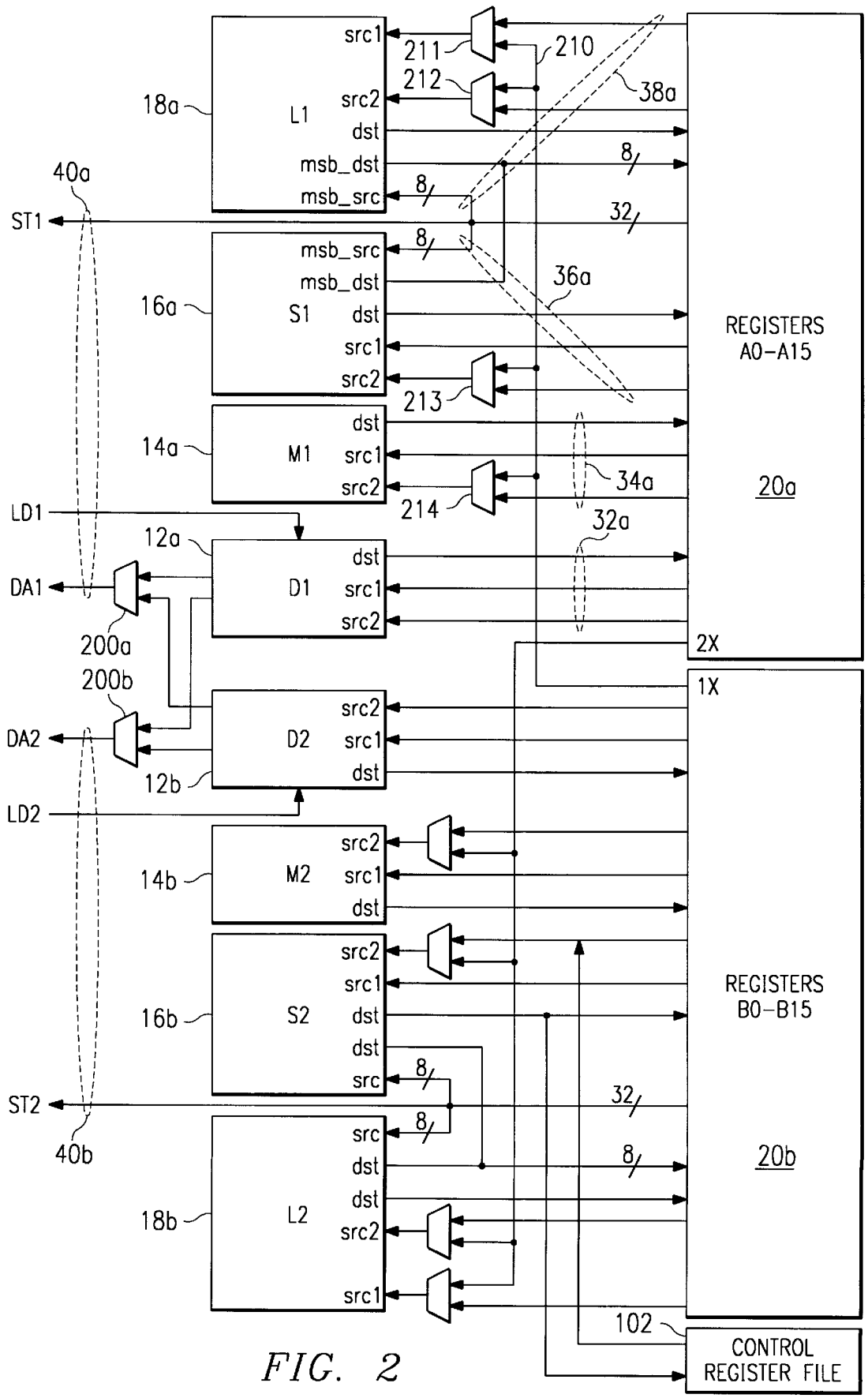
FIG. 2 is a block diagram of the execution units and register files of the microprocessor of FIG. 1A.

FIG. 2 is a block diagram of the execution units and register files of the microprocessor of FIG. 1A and shows a more detailed view of the buses connecting the various functional blocks. In this figure, all data busses are 32 bits wide, unless otherwise noted. Bus 40a has an address bus DA1 which is driven by mux 200a. This allows an address generated by either load/store unit D1 or D2 to provide an address for loads or stores for register file 20a. Data Bus LD1 loads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1, with the assistance of mux 200b for selecting an address.

ALU unit L1 performs the following types of operations: 32/40 bit arithmetic and compare operations; left most 1, 0, bit counting for 32 bits; normalization count for 32 and 40 bits; and logical operations. ALU L1 has input src1 for a 32 bit source operand and input src2 for a second 32 bit source operand. Input msb_src is an 8 bit value used to form 40 bit source operands. ALU L1 has an output dst for a 32 bit destination operands. Output msb_dst is an 8 bit value used to form 40 bit destination operands. Two 32 bit registers in register file 20a are concatenated to hold a 40 bit operand. Mux 211 is connected to input src1 and allows a 32 bit operand to be obtained from register file 20a via bus 38a or from register file 20b via bus 210. Mux 212 is connected to input src2 and allows a 32 bit operand to be obtained from register file 20a via bus 38a or from register file 20b via bus 210. ALU unit L2 operates similarly to unit L1.

ALU/shifter unit S1 performs the following types of operations: 32 bit arithmetic operations; 32/40 bit shifts and 32 bit bit-field operations; 32 bit logical operations; branching; and constant generation. ALU S1 has input src1 for a 32 bit source operand and input src2 for a second 32 bit source operand. Input msb_src is an 8 bit value used to form 40 bit source operands. ALU S1 has an output dst for a 32 bit destination operands. Output msb_dst is an 8 bit value used to form 40 bit destination operands. Mux 213 is connected to input src2 and allows a 32 bit operand to be obtained from register file 20a via bus 36a or from register file 20b via bus 210. ALU unit S2 operates similarly to unit S1, but can additionally perform register transfers to/from the control register file 102.

Multiplier M1 performs 16×16 multiplies. Multiplier M1 has input src1 for a 32 bit source operand and input src2 for a 32 bit source operand. ALU S1 has an output dst for a 32 bit destination operands. Mux 214 is connected to input src2 and allows a 32 bit operand to be obtained from register file 20a via bus 34a or from register file 20b via bus 210. Multiplier M2 operates similarly to multiplier M1.

FIG. 3A and 3B shows two memory maps for the microprocessor of FIG. 1A. The memory is byte addressable and it's total address range is 4G bytes (corresponding to a 32-bit internal address). The memory map is divided between the internal program memory 23, internal data memory 22 and 3 external memory spaces and internal peripheral space. A section of internal memory can be accessed by the host port interface (HPI) 60.

The internal memory consists of 512 k bits of on-chip program/cache memory 23 and 512 k bits of on-chip data memory 22. The program memory, configurable as cache or program, is organized in 2 k of 256-bit instruction fetch packets. The CPU 10 fetches all instructions one fetch packet at a time. The packets are processed at the maximum rate of eight 32-bit instructions per CPU cycle or at a minimum of one instruction per cycle. The internal data memory is byte addressable by the CPU (for reads as well as writes) and supports byte, half-word and full word transfers.

All external data accesses by CPU 10 or DMA 100 pass through the external memory interface (EMIF) 103. The external memory is divided into 3 spaces—CE0, CE1 and CE2. Each has a dedicated chip enable signal that is asserted during data access to or from the corresponding space. Each external space has assigned a separate internal peripheral bus register that determines the shape of the read/write cycle when accessing asynchronous memory.

In addition to asynchronous memory, CE0 and CE2 spaces can also interface to other types of memory. SBSRAM or SDRAM memory can be assigned to those two spaces by controlling signal levels on signal groups CE0_TYPE and CE2_TYPE (pins DC2–DC5) during Reset.

External memory space CE1 can only interface to asynchronous memory. However, while spaces CE0 and CE2 are always 32-bit wide, the CE1 memory space can also be configured to the width of 8 or 16 bits by controlling signal levels on signal group CE1_WIDTH pins 208–209 of FIG. 4. The EMIF automatically packs bytes and half-words into words during read cycles—a feature typically used when booting from an 8- or 16-bit EPROM. The CE1 memory space can be used for ROM interfacing because ROM cycles are similar to asynchronous SRAM read cycles. Note, that while the CE1 space is the only external memory space that allows read cycles from 8- or 16-bit wide memory, read cycles from any external memory space can access byte or half-word sized data from 32-bit wide external memory. The EMIF data write cycles can transfer bytes, half-words or words to external memory as well, using $BE_{13}$ control signals for byte selects. Data read cycles always latch all 4 bytes (all 4 BE_'s active) and the CPU then extracts the appropriate bytes internally if the data size is less then 32 bits. Note, that EMIF writes requested by the program memory controller 104 or the DMA 100/101, are always 32-bits wide, as opposed to 8-, 16-, or 32-bit transfers originated by the data memory controller 105.

Figure 4:
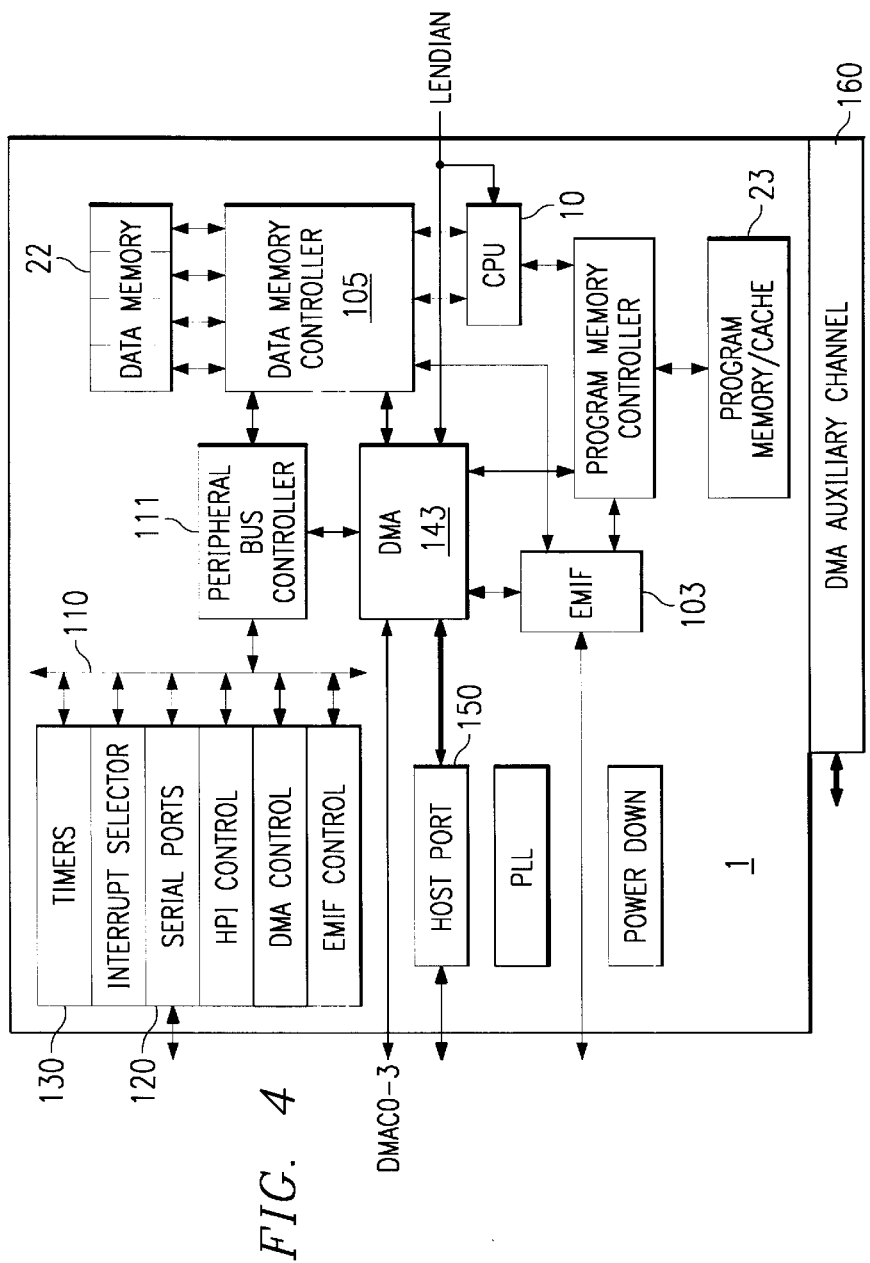
FIG. 4 is a block diagram of a DMA controller interconnected to memory mapped modules of the microprocessor of FIGS. 1A–1C.

Referring now to FIG. 4, which is a block diagram of DMA controller 143 and interconnected memory mapped modules of microprocessor 1. Direct Memory Access (DMA) Controller 143 transfers data between points in the memory map without intervention by the CPU. The DMA allows movement of data to and from internal memory, internal peripherals, or external devices to occur in the background of CPU operation. The DMA has four independent programmable channels allowing four different contexts for DMA operation. Each DMA channel can be independently configured to transfer data elements of different sizes: 8-bit bytes, 16-bit half-words, or 32-bit words. In addition a fifth (auxiliary) channel allows the DMA to service request from a peripheral with address generation capability such as a host port interface. In discussing DMA operations several terms are important:

Read Transfer: The DMA reads the data element from a source location in memory.

Write Transfer: The DMA writes the data element read during a read transfer to its destination location in memory.

Element Transfer: The combined read and write transfer for a single data element.

Frame Transfer: Each DMA channel has an independently programmable number of elements per frame. In completing a frame transfer, the DMA moves all elements in a single frame.

Block Transfer: Each DMA channel also has an independently programmable number of frames per block. In completing a block transfer, the DMA moves all frames it has been programmed to move.

DMA 143 includes the following features, each of which will be described in following paragraphs:

1) Background Operation: The DMA operates independently of the CPU.
2) High Throughput: Elements can be transferred at the CPU clock rate.
3) Four Channels: The DMA can keep track of the contexts of four independent block transfers.
4) Auxiliary Channel: This simple channel allows a peripheral with address generation capability such as host port 150 to make requests into the CPU's memory space.
5) Split Operation: A single channel maybe used to perform both the receive and transmit transfers to a peripheral, effectively acting like two DMA channels without the additional cost.
6) Multi-Frame Transfer: Each block transfer can consist of multiple frames of a fixed programmable size.
7) Programmable Priority: Each channel has independently programmable priorities versus the CPU for each of the memory-mapped resources.
8) Programmable Address Generation: Each channel's source and destination address registers can have configurable indexes through memory on each read and write transfer, respectively. The address may remain constant, increment, decrement, or be adjusted by a programmable value. The programmable value allows a different index for the last transfer in a frame and for the preceding transfers.
9) Full-Address 32-Bit Address Range: The DMA can access any point in the memory map (FIG. 3A–3B):
   a) the on-chip data memory.
   b) the on-chip program memory when mapped into memory space rather than being utilized as cache.
   c) on-chip peripherals.
   d) the external memory interface (EMIF).
   e) programmable Width Transfers: Each channel can be independently be configured to transfer either 8-bit bytes, 16-bit half-words, or 32-bit words.
   f) Auto-Initialization: Once a block transfer is complete, a DMA channel may automatically re-initialize itself for the next block transfer.
   g) Event Synchronization: Each read, write, or frame transfer may be initiated by selected events.
   h) Interrupt Generation: On completion of each frame transfer or of an entire block transfer as well a on various error conditions, each DMA channel may send an interrupt to the CPU.

Figure 5:
FIG. 5 is an illustration of a DMA global data register diagram of the DMA controller of FIG. 4.

DMA 143 is controlled and configured by several memory mapped control registers. Table 1 and Table 2 show how the DMA control registers are mapped into CPU 10's memory space. These registers include the DMA Global Control and Data Registers as well as number of independent control registers for each channel. The DMA Global Data registers are usable as selected by channels for a variety of functions, as described in Table 3. FIG. 5 illustrates a DMA Global Data Register.

TABLE 1

DMA Control Registers by Address

| Hex Byte Address | Name |
| --- | --- |
| 01840000 | DMA Channel 0 Primary Control |
| 01840004 | DMA Channel 2 Primary Control |
| 01840008 | DMA Channel 0 Secondary Control |
| 0184000C | DMA Channel 2 Secondary Control |
| 01840010 | DMA Channel 0 Source Address |
| 01840014 | DMA Channel 2 Source Address |
| 01840018 | DMA Channel 0 Destination Address |
| 0184001C | DMA Channel 2 Destination Address |
| 01840020 | DMA Channel 0 Transfer Counter |
| 01840024 | DMA Channel 2 Transfer Counter |
| 01840028 | DMA Global Data Register 0 |
| 0184002C | DMA Global Data Register 1 |
| 01840030 | DMA Global Data Register 2 |
| 01840034 | DMA Global Data Register 3 |
| 01840038 | DMA Global Data Register 4 |
| 0184003C | DMA Global Data Register 5 |
| 01840040 | DMA Channel 1 Primary Control |
| 01840044 | DMA Channel 3 Primary Control |
| 01840048 | DMA Channel 1 Secondary Control |
| 0184004C | DMA Channel 3 Secondary Control |
| 01840050 | DMA Channel 1 Source Address |
| 01840054 | DMA Channel 3 Source Address |
| 01840058 | DMA Channel 1 Destination Address |
| 0184005C | DMA Channel 3 Destination Address |
| 01840060 | DMA Channel 1 Transfer Counter |
| 01840064 | DMA Channel 3 Transfer Counter |
| 01840068 | DMA Global Data Register 6 |
| 0184006C | DMA Global Data Register 7 |
| 01840070 | DMA Global Control Register |

TABLE 2

DMA Control Registers by Register Name

| Name | Hex Byte Address |
| --- | --- |
| DMA Channel 0 Destination Address | 01840018 |
| DMA Channel 0 Primary Control | 01840000 |
| DMA Channel 0 Secondary Control | 01840008 |
| DMA Channel 0 Source Address | 01840010 |
| DMA Channel 0 Transfer Counter | 01840020 |
| DMA Channel 1 Destination Address | 01840058 |
| DMA Channel 1 Primary Control | 01840040 |
| DMA Channel 1 Secondary Control | 01840048 |
| DMA Channel 1 Source Address | 01840050 |
| DMA Channel 1 Transfer Counter | 01840060 |
| DMA Channel 2 Destination Address | 0184001C |
| DMA Channel 2 Primary Control | 01840004 |
| DMA Channel 2 Secondary Control | 0184000C |
| DMA Channel 2 Source Address | 01840014 |
| DMA Channel 2 Transfer Counter | 01840024 |
| DMA Channel 3 Destination Address | 0184005C |
| DMA Channel 3 Primary Control | 01840044 |
| DMA Channel 3 Secondary Control | 0184004C |
| DMA Channel 3 Source Address | 01840054 |
| DMA Channel 3 Transfer Counter | 01840064 |
| DMA Global Control Register | 01840070 |
| DMA Global Data Register 0 | 01840028 |
| DMA Global Data Register 1 | 0184002C |
| DMA Global Data Register 2 | 01840030 |
| DMA Global Data Register 3 | 01840034 |
| DMA Global Data Register 4 | 01840038 |
| DMA Global Data Register 5 | 0184003C |
| DMA Global Data Register 6 | 01840068 |
| DMA Global Data Register 7 | 0184006C |

TABLE 3

DMA Global Data Register Uses

| DMA Global Data Register | Source Reload | Destination Reload | Count Reload | Index | Split Address |
|---|---|---|---|---|---|
| 0 | | | | | |
| 1 | | | | | |
| 2 | | | | | |
| 3 | | | | | |
| 4 | | | | | |
| 5 | | | | | |
| 6 | | | | | |
| 7 | | | | | |

DMA Channel Control Registers are illustrated in FIG. 6 and FIG. 7. The DMA Channel Primary (FIG. 6) and Secondary Control Register (FIG. 7) contain bit fields that control each individual DMA Channel independently. These fields are described in Table 4 and Table 5, respectively.

TABLE 4

DMA Channel Primary Control Register Bit Field Definitions

| Bitfield | Description |
|---|---|
| START | START=00b, stop |
| | START=01b, start, without auto-initialization |
| | START=10b, pause |
| | START=11b, start with auto-initialization |
| STATUS | STATUS=00b, stopped |
| | STATUS=01b, running, without auto-initialization |
| | STATUS=10b, paused |
| | STATUS=11b, running, with auto-initialization |
| SRC DIR, DST DIR | Source/Destination Address Modification after Element Transfers. (SRC/DST) DIR=00b, no modification. |
| | (SRC/DST) DIR=01b, increment by element size in bytes |
| | (SRC/DST) DIR=10b, decrement by element size in bytes. |
| | (SRC/DST) DIR=11b, adjust using DMA Global Data Register selected by INDEX. |
| RSYNC, WSYNC | Read transfer/write transfer synchronization. |
| | (R/W)SYNC=00000b, no synchronization. |
| | (R/W)SYNC=other sets synchronization event |
| FS | Frame Synchronization |
| | FS=0, disable, |
| | FS=1, RSYNC event used to synchronize entire frame. |
| TCINT | Transfer Controller Interrupt. |
| | TCINT=0 interrupt disabled |
| | TCINT=1 interrupt enabled |
| ESIZE | Element size |
| | ESIZE=00b, 32-bit |
| | ESIZE=01b, 16-bit |
| | ESIZE=10b, 8-bit |
| | ESIZE=11b, reserved |
| PRI | Priority Mode: DMA v. CPU |
| | PRI=0, CPU priority |
| | PRI=1, DMA priority |
| SPLIT | Split channel mode. |
| | SPLIT=00b disabled |
| | SPLIT=01b, enabled, use DMA Global Data Register 4 as split address. |
| | SPLIT=10b, enabled, use DMA Global Data Register 5 as split address. |
| | SPLIT=11b, enabled, use DMA Global Data Register 6 as split address. |
| CNT RELOAD | DMA Channel Transfer Counter Reload for Auto-Initialization and Multi-Frame Transfers |
| | CNT RELOAD=0, Reload with DMA Global Data Register 0 |
| | CNT RELOAD=1, Reload with DMA Global Data Register 1 |
| INDEX | Selects the DMA Global Data Register to use as a programmable index. |
| | INDEX=0, use DMA Global Data Register 2 |
| | INDEX=1, use DMA Global Data Register 3 |
| EMOD | Emulation Mode |
| | EMOD=0, DMA channel keeps running during an emulation halt |

TABLE 4-continued

DMA Channel Primary Control Register Bit Field Definitions

| Bitfield | Description |
|---|---|
| | EMOD=1, DMA channel paused during an emulation halt |
| SRC RELOAD DST RELOAD | DMA Channel Source/Destination Address Reload for Auto-Initialization |
| | SRC/DST RELOAD=00b, do not reload during auto-initialization. |
| | SRC/DST RELOAD=01b, use DMA Global Data Register 5 as reload. |
| | SRC/DST RELOAD=10b, use DMA Global Data Register 6 as reload. |
| | SRC/DST RELOAD=11b, use DMA Global Data Register 7 as reload. |

TABLE 5

DMA Channel Secondary Control Register Bit Fields

| Bit field | Description |
|---|---|
| SX COND FRAME COND LAST COND BLOCKCOND (R/W)DROP COND | DMA Condition. See Table 10 for description. |
| | COND=0, condition not detected |
| | COND=1, condition detected |
| SX IE FRAME IE LAST IE BLOCK IE (R/W)DROP IE | DMA Condition Interrupt Enable. See 0 for description. |
| | IE=0, associated condition disables DMA channel interrupt |
| | IE=1, associated condition enables DMA channel interrupt |
| (R/W)SYNC STAT | Read, Write Synchronization Status |
| | Write 1 to set associated status. |
| | STAT=0, synchronization not received |
| | STAT=1, synchronization received |
| DMAC EN | DMAC Pin Control |
| | DMAC EN=000b, DMAC pin held low |
| | DMAC EN=001b, DMAC pin held high |
| | DMAC EN=010b, DMAC reflects RSYNC STAT |
| | DMAC EN=011b, DMAC reflects WSYNC STAT |
| | DMAC EN=100b, DMAC reflects FRAME COND |
| | DMAC EN=101b, DMAC reflects BLOCK COND |
| | DMAC EN=other, reserved |
| (R/W)SYNC CLR | Read, Write Synchronization Status Clear |
| | Read as 0, write 1 to clear associated status. |

Referring again to FIGS. 3A–3B, aspects of the DMA's use of the memory map will be described in more detail. Requests are sent to one of four resources:

1) External Memory Interface
2) Internal Program Ram
3) Internal Peripheral Bus
4) Internal Data Ram The location of source and destination are computed at the beginning for a block transfer. Thus, the source address is assumed to point to the same one of these four spaces throughout a block transfer. This constraint also applies to the destination address.

Each DMA channel may be started independently either manually through direct CPU access or through auto-initialization. In addition, each DMA channel may be stopped or paused independently through direct CPU access.

Manual Start Operation: To start DMA operation for a particular channel, once all other DMA control registers are written to their desired values, the DMA Channel Control Register should be written to its desired value with START=01b. Writing this value to a DMA channel that has already been started has no effect.

Pause Operation: Once started, a DMA channel may then be paused by writing START=10b. When paused, the DMA channel completes any the write transfers element transfers whose read transfer requests have completed. Also, if the DMA channel has all necessary read synchronization, one more element additional element transfer will be allowed to complete. Once paused, the value on STATUS is 10b.

Stop Operation: The DMA may also be stopped by writing START=00b. Here, the DMA channel stops immediately and discards any data held internally from completed read transfers. The actual status of a DMA channel may be observed by reading the START field in the DMA Channel Control register. Once a DMA transfer is complete, unless auto-initialization is enabled, the DMA Channel returns to the stopped state and STATUS=00b.

Auto-initialization will now be described. The DMA can automatically reinitialize itself after completion of a block transfer. Some of the DMA control registers can be preloaded for the next block transfer through reload registers. Selected DMA Global Data registers act as the reload registers. Using this capability some of the parameters of the DMA channel can be set well in advance of the next block transfer. Auto-initialization allows:

Continuous Operation: Continuous operation allows the CPU a long slack time during which it can reconfigure the DMA for the subsequent transfer. Normally, the CPU would have to reinitialize the DMA immediately after completion of the last write transfer in the current block transfer and before the first read synchronization for the next block transfer. In general, with the reload registers, it can reinitialize these values for the next block transfer anytime after the current block transfer begins.

Repetitive Operation: As a special case of continuous operation, once a block transfer completes the DMA repeats the previous block transfer. In this case, the CPU does not pre-load the reload registers with new values for each block transfer. Instead, it only loads them on the first block transfer.

Enabling Auto-Initialization: By writing START=11b, in the DMA Channel Control Register, auto-initialization is enabled. In this case, after completion of a block transfer, the DMA Channel is restarted and the selected DMA Channel Registers are reloaded. If restarting after a pause, this START must be re-written as 01b for auto-initialization to be enabled.

The apparatus of DMA Channel Reload Registers will now be described. For auto-initialization, the successive block transfers are assumed to be similar. Thus, the reload values are only selectable for those registers that are modified during a block transfer: the transfer counter and address registers. Thus, the DMA Channel Transfer Counter as well as the DMA Channel Source and Destination Address Registers have associated reload registers, as selected by the associated RELOAD fields in the DMA Channel Primary Control Register (Table 4). The reload registers are stored in particular DMA Global Data registers.

Note that it is possible to not reload the source or destination address register in auto-initialization mode. This capability allows you to have register maintain its value that did not change during block transfer. Thus, you do not have to dedicate a DMA Global Data Register to a value that was static during block transfer. A single channel may use the same value for multiple channel registers. For example, in split mode, the source and destination address may be the same. Similarly, multiple channels may use the same reload values. For example, two channels may have the same transfer count reload value.

Upon completion of a block transfer, these registers are reloaded with the associated reload register. Note that in the case of the DMA Channel Transfer Counter Register, reload occurs after the end of each frame transfer, not just after the end of the entire block transfer. The reload value for the DMA Channel Transfer Counter is necessary whenever multi-frame transfers are configured, not just when auto-initialization is enabled.

As discussed earlier, the DMA may allow read transfers to get ahead of write transfers and provides the necessary buffering to facilitate this capability. To support this, the necessary reload at the end of blocks and frames occurs independently for the read (source) and write (destination) portions of the DMA Channel. Similarly, in the case of split channel operation, described later, the source and destination address are independently reloaded when the associated transmit or receive element transfers, respectively, complete a block transfer.

The DMA Channel Transfer Counter Reload can only be re-written by the user after the next to last frame in the current block transfer completes. Otherwise, the new reload values would affect subsequent frame boundaries in the current block transfer. However, if the frame size is the same for the current and next block transfers, this restriction is not relevant. A fuller explanation of the DMA Channel Transfer Counter is provided in later paragraphs.

FIG. 8 illustrating a DMA Channel Transfer Counter. The DMA Channel Transfer Counter contains bit fields that represent the number of frames and the number of elements per frame to be transferred. FIG. 9 shows how a DMA Global Data Register can be used as the reload value for the transfer counter.

FRAME COUNT: This 16-bit unsigned value sets the total number of frames in the block transfer. Thus, if a block transfer contains a single frame, this value should be set to its default of 1. The maximum number of frames per block transfer is 65535. This counter is decremented upon the completion of the last read transfer in a frame transfer. Once the last frame is transferred, the entire counter is reloaded with the DMA Global Data Register selected by the CNT RELOAD field in the DMA Channel Primary Control Register. Also note that initial values of 0 and 1 to FRAME COUNT have the same effect and a single frame will be transferred.

ELEMENT COUNT: This 16-bit unsigned value sets the number of elements per frame. This counter is decremented after the read transfer of each element. The maximum number of elements per frame transfer is 65535. Once the last element in each frame, is reached, ELEMENT COUNT is reloaded with the 16 LSBs of the DMA Global Data Register selected by the CNT RELOAD field in the DMA Channel Primary Control Register. This reloading is unaffected by auto-initialization mode. Before block transfer begins, the counter and selected DMA Global Data Register must be loaded with the same 16 LSBs to assure that the first and remaining frames have the same number of elements per frame. Also, in any multi-frame transfer, a reload value must be specified, not just when auto-initialization is enabled. If element count is initialized as 0, operation is undefined.

Synchronization will now be described. Synchronization allows DMA transfers to be triggered by events such as interrupts from internal peripherals or external pins. Three types of synchronization may be enabled for each channel:

1) Read Synchronization: Each read transfer waits for the selected event to occur before proceeding.
2) Write Synchronization: Each write transfer waits for the selected event to occur before proceeding.

3) Frame Synchronization: Each frame transfer waits for the selected event to occur before proceeding.

Synchronization Events: The events are selected by the RSYN and WSYNC fields in the DMA Channel Primary Control Register. If FS=1 in this register, then the event selected by RSYNC enables an entire frame. Up to 31 events are available. If the value of these fields is set to 00000b then no synchronization is necessary. In this case, the read, write, or frame transfers occur as soon as the resource is available to that channel. The association between values in values in these fields to events is shown in Table 6.

TABLE 6

Synchronization Events

| Event Number (Binary) | Event Acronym | Event Description |
| --- | --- | --- |
| 00000 | none | no synchronization |
| 00001 | TINT0 | Timer 0 Interrupt |
| 00010 | TINT1 | Timer 1 Interrupt |
| 00011 | SD_INT | EMIF SDRAM Timer Interrupt |
| 00100 | EXT_INT4 | External Interrupt Pin 4 INT (4) |
| 00101 | EXT_INT5 | External Interrupt Pin 5 INT (5) |
| 00110 | EXT_INT6 | External Interrupt Pin 6 INT (6) |
| 00111 | EXT_INT7 | External Interrupt Pin 7 INT (7) |
| 01000 | DMA_INT0 | DMA Channel 0 Interrupt |
| 01001 | DMA_INT1 | DMA Channel 1 Interrupt |
| 01010 | DMA_INT2 | DMA Channel 2 Interrupt |
| 01011 | DMA_INT3 | DMA Channel 3 Interrupt |
| 01100 | XEVT0 | MCSP 0 Transmit Event |
| 01101 | REVT0 | MCSP 0 Receive Event |
| 01110 | XEVT1 | MCSP 1 Transmit Event |
| 01111 | REVT1 | MCSP 1 Receive Event |
| 10000 | DSPINT | Host Port 150Host to DSP Interrupt |
| other | reserved | |

Note:
in Table 6, MCSP refers to multichannel serial port 120, which is described in related U.S. Pat. Serial No. 09/055,011 (TI-26204), which has been incorporated herein by reference.

The DMA Channel Secondary Control Register (Table 5) contains STAT and CLR fields for read and write synchronization events.

Latching of DMA Synchronization Events: An inactive to active transition of the selected event is latched by each DMA channel. The occurrence of this transition causes the associated STAT field to be set in the DMA Channel Secondary Control register. Note that if no synchronization is selected the STAT bit is always read as 1. Also, note that a single event can trigger multiple actions.

User Clearing and Setting of Events: By clearing pending events before starting a block transfer you can force the DMA Channel to wait for the next event. Conversely, by setting events before starting a block transfer you can force the synchronization events necessary for the first element transfer. You may clear or set events (and thus the related STAT bit) by writing 1 to the corresponding CLR or STAT field, respectively. Note that writing a zero to either of these bits has no effect. Also, the CLR bits are always read as 0 and have no associated storage. Separate bits for setting or clearing are provided to allow clearing of some bits without setting others and vice-versa. Note that user manipulation of events has priority over any simultaneous automated setting or clearing of events.

Automated Event Clearing will now be described. The latched STAT for each synchronizing event is only cleared when any action associated with that event completes. Events are cleared as quickly as possible to reduce the minimum time between synchronizing events. This capability effectively increases the throughput at which events can be recognized. This is described in detail for each type of synchronization below:

Clearing Read Synchronization Condition: The latched condition for read synchronization is cleared when the DMA completes the request for the associated read transfer.

Clearing Write Synchronization Condition: The latched condition for write synchronization is cleared when the DMA completes the request for the associated write transfer.

Clearing Frame Synchronization Condition: Frame synchronization is clears the RSYNC STAT field when the DMA completes the request for the first read transfer in the new frame.

Address Generation will now be described. For each channel, the DMA performs address computation for each read transfer and write transfer. The DMA allows creation of a variety of data structures. For example, the DMA can traverse an array striding through every $n^{th}$ element. Also, it can be programmed to effectively treat the various elements in a frame as coming from separate sources and group each source's data together.

Figure 10:
FIG. 10 is an illustration of a DMA channel source address register of the DMA controller of FIG. 4.
Figure 11:
FIG. 11 is an illustration of a DMA channel destination address register of the DMA controller of FIG. 4.
Figure 12:
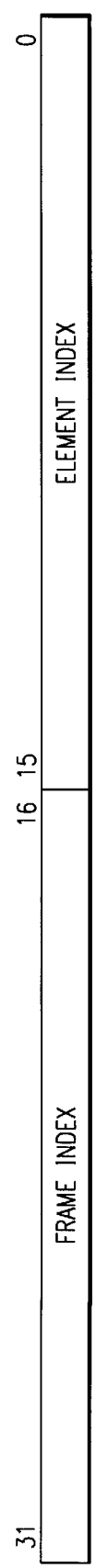
FIG. 12 is an illustration of a DMA global data register as used for programmable index of the DMA controller of FIG. 4.

FIG. 10 and FIG. 11 illustrate the DMA Channel Source Address and Destination Address Registers, which hold the addresses for the next read transfer and write transfer, respectively.

Basic Address Adjustment as shown in FIG. 7, the SRC DIR and DST DIR fields can set the index to increment, to decrement, or to not effect the DMA Channel Source and Destination Address Registers, respectively. By default, these values are set to 00b to disable any incrementing or decrementing. If incrementing or decrementing is enabled, then address adjustment amount is by the element size in bytes. For example, if the source address is set to increment and 16-bit half-words are being transferred, then the address is incremented by 2 after each read transfer.

Address Adjustment with the DMA Channel Index Registers: As shown in Table 4, the SRC DIR and DST DIR field can independently allow you to select a particular DMA Global Data Register, illustrated in FIG. 12, to determine the address adjustment. The particular DMA Global Data Register is selected via INDEX field in the DMA Channel Primary Control Register. Unlike basic address adjustment, this mode allows different adjustment amount depending on whether or not the element transfer is the last in the current frame. The normal adjustment value (ELEMENT INDEX) is contained in the 16 LSBs of the selected DMA Global Data Register. The adjustment value (FRAME INDEX) for the end of the frame, is determined by the 16 MSBs of the selected DMA Global Data Register. Both these fields contain signed 16-bit values. Thus, the index amounts can range from −32768 to 32767.

These fields affect address adjustment as follows:
1) ELEMENT INDEX: For all except the last transfer in a frame, ELEMENT INDEX determines the amount to be added to the DMA Channel Source for Destination Address Register as selected by the SRC DIR or DST DIR field after each read or write transfer, respectively
2) FRAME INDEX: If the read or write transfer is the last in a frame, FRAME INDEX (and not the ELEMENT INDEX) field is used for address adjustment. This occurs in both single frame and multi-frame transfers.

Element Size, Alignment, and Endianness: Using the ESIZE field in the DMA Channel Control Register, the user may configure the DMA to transfer 8-bit bytes, 16-bit halfwords, or 32-bit words on each transfer. The following registers and bit fields must be loaded with properly aligned values:

1) DMA Channel Source and Destination Address Registers and any associated reload registers.
2) ELEMENT INDEX
3) FRAME INDEX In the case of word transfers, these registers must contain values that are multiples of 4, thus aligned on a word address. In the case of half-word transfers they must be multiples of 2, thus aligned on a half-word address. If unaligned values are loaded, operation is undefined. There is no alignment restriction for byte transfers. All accesses to program memory must be 32-bits in width. Also, you must be aware of the endianness when trying to access a particular 8-bit or 16-bit field within a 32-bit register. For example, in little endian, an address ending in 00b selects the LSbyte whereas 11b selects the LSbyte in big endian.

An example using frame index to reload addresses will now be described. In an auto-initialized, single frame block transfer, the FRAME index can be used in place of a reload register to re-compute the next address. For example, consider a single frame transfer where 10 bytes are to be moved from a static external address to alternating locations (skip one byte):

SRC DIR=00b, static source address.
DST DIR=11b, programmable index value
ELEMENT INDEX=10b, 2 byte destination stride
FRAME INDEX=9×2=18=10010b, correct by −18 byte locations to restart destination at same place.

An example of transferring a large single block will now be described. The ELEMENT COUNT and FRAME COUNT can be used in conjunction to effectively allow single frame block transfers of greater than 65535 in size. Here, the product of the element count and frame count can form a larger effective element count. The following must be performed:

1) If the address is set to be adjusted using a programmable value (DIR=11b), the FRAME INDEX must equal the ELEMENT INDEX if the address adjustment is determined by a DMA Global Data Register. This applies to both source and destination addresses. If the address is not set to be adjusted by a programmable value, this constraint does not apply because by default the same address adjustment occurs at element and frame boundaries.

2) Frame synchronization must be disabled (FS=0 in the DMA Channel Primary Control Register). This prevents requirements for synchronization in the middle of the large block.

3) The number of elements in the first frame is Ei. The number of elements in successive frames is ((F−1)×Er). The effective element count will be ((F−1)×Er)+Ei. Where:

F=The initial value of the FRAME COUNT
Er=ELEMENT COUNT Reload value
Ei=initial value of the ELEMENT COUNT Thus, to transfer 128K+1 elements, one could set the F=5, Er=32K, and Ei=1.

An example of sorting will now be described. To have transfers located in memory by ordinal location within a frame (i.e. the first transfer of the first frame followed by the first transfer of the second frame):

1) ELEMENT INDEX should be set to: F×S.
2) FRAME INDEX be set to: −(((E−1)×F)−1)×S, where
   E=the initial value of ELEMENT COUNT (the number of elements per frame) as well as the ELEMENT COUNT RELOAD.
   F=the initial value of FRAME COUNT (the total number of frames).
   S=the element size in bytes.

Consider a transfer with three frames (F=3) of four half-word elements each (E=4, S=2). Thus, ELEMENT INDEX=3×2=6 and FRAME INDEX=−(((4−1)×3)−1)×2=−16. Assume that the source address is not modified and the destination increments starting at 0×80000000.

Table 7 and Table 8 show how this sorting works for this example.

TABLE 7

Sorting Example in Order of DMA Transfers

| Frame | Element | Address | Post Adjustment |
|---|---|---|---|
| 0 | 0 | 0x80000000 | +6 |
| 0 | 1 | 0x80000006 | +6 |
| 0 | 2 | 0x8000000C | +6 |
| 0 | 3 | 0x80000012 | −16 |
| 1 | 0 | 0x80000002 | +6 |
| 1 | 1 | 0x80000008 | +6 |
| 1 | 2 | 0x8000000E | +6 |
| 1 | 3 | 0x80000014 | −16 |
| 2 | 0 | 0x80000004 | +6 |
| 2 | 1 | 0x8000000A | +6 |
| 2 | 2 | 0x80000010 | +6 |
| 2 | 3 | 0x80000016 | −16 |

TABLE 8

Sorting Grouping Ordered By Address

| Frame | Element | Address |
|---|---|---|
| 0 | 0 | 0x80000000 |
| 1 | 0 | 0x80000002 |
| 2 | 0 | 0x80000004 |
| 0 | 1 | 0x80000006 |
| 1 | 1 | 0x80000008 |
| 2 | 1 | 0x8000000A |
| 0 | 2 | 0x8000000C |
| 1 | 2 | 0x8000000E |
| 2 | 2 | 0x80000010 |
| 0 | 3 | 0x80000012 |
| 1 | 3 | 0x80000014 |
| 2 | 3 | 0x80000016 |

Split Channel operation will now be described. Split channel operation allows a single DMA channel to provide the capability of two channels to service both the input (receive) and output (transmit) streams from an external of internal peripheral with a fixed address.

Figure 13:
FIG. 13 is an illustration of a DMA global data register used for split address of the DMA controller of FIG. 4.

FIG. 13 illustrates a DMA Global Data Register used for split addresses. The DMA Global Data Register selected by the SPLIT field in the DMA Primary Control Register determines the address of the peripheral that is to be accessed for split transfer:

Split Source Address: This address is the source for the input stream to the Processor 1. The selected DMA Global Control Register contains this split source address.

Split Destination Address: This address is the destination for the output data stream from Processor 1. The split destination address is assumed to be one word address (4 byte addresses) greater than the split source address.

Notice that the 3 LSBs are fixed at 0. The 2 LSBs are fixed at zero to force alignment at a word address. The third LSBs is 0, because the split source address is assumed to be on an even word boundary. Thus, the split destination address is assumed to be on an odd word boundary. These relationships hold regardless of the width of the transfer. Internal peripherals will conform to this convention. For external peripherals, an address decode must appropriately to adhere to this convention.

Split DMA Operation will now be described. Split operation consists of transmit element transfers and receive element transfers. In turn, these each consist of a read and a write transfer:

1) Transmit Element Transfer
   a) Transmit Read Transfer: Data is read from the DMA Channel Source Address. The Source Address is then adjusted as configured. This event is not synchronized.
   b) Transmit Write Transfer: Data from the transmit read transfer is written to the split destination address. This event is synchronized as indicated by the WSYNC field. The transfer count is then decremented. The DMA channel internally keeps track of the number of pending receive transfers.
2) Receive Element Transfer
   a) Receive Read Transfer: Data is read from the split source address. This event is synchronized as indicated by the RSYNC field.
   b) Receive Write Transfer: Data from the receive read transfer is written to the Destination Address. The destination address is then adjusted as configured. This event is not synchronized.

Note, since only a single Element Count and Frame Count exists per channel, the ELEMENT COUNT and the FRAME COUNT are the same for both the received and the transmitted data. For split operation to work properly, both the RSYNC and WSYNC fields must be set to synchronization events. Also, frame synchronization must be disabled in split mode.

For all transfers the above sequence is maintained. However, the transmit transfers do not have to wait for all previous receive element transfers to complete before proceeding. Therefore, it is possible for the transmit stream to get ahead of the receive stream. The DMA Channel Transfer counter decrements (or reinitializes) after the associated transmit transfer completes. However, re-initialization of the source address register occurs after all transmit element transfers complete. This configuration works as long as transmit transfers do not get eight or more transfers ahead of the receive transfers. In that case, transmit element transfers will be stopped, possibly causing missing of synchronization events. For cases where receive or transmit element transfers are within seven or less transfers of the other, the DMA channel maintains this information as internal status.

Resource Arbitration and Priority Configuration will now be described. Priority decides which of competing requesters have control of a resource with multiple requests. The requesters include:

1) the DMA Channels
2) the CPU's program and data accesses.

The resources include:
1) internal Data Memory including each interleave of internal data memory.
2) the internal peripheral registers which are accessed through the peripheral bus.
3) internal program memory.
4) the External Memory Interface (EMIF).

Two aspects of priority are programmable:
1) DMA versus CPU Priority Each DMA channel may independently be configured in high priority mode by setting the PRI bit in the associated DMA Channel Control Register. The AUXPRI field in the DMA Global Control Register allows same feature for the auxiliary channel. When in high priority mode, the associated channel's requests are sent to the appropriate resource with a signal indicating the high priority status. By default all these fields are 0, disabling the high priority mode. Each resource can use this signal in its own priority scheme for resolving conflicts. Refer to the documentation for the particular resource for how it utilizes this signal.
2) Priority Between DMA Channels: The DMA has a fixed priority scheme with channel 0 having highest priority and channel 3 having lowest priority. The auxiliary channel may be given a priority anywhere within this hierarchy.

Figure 14:
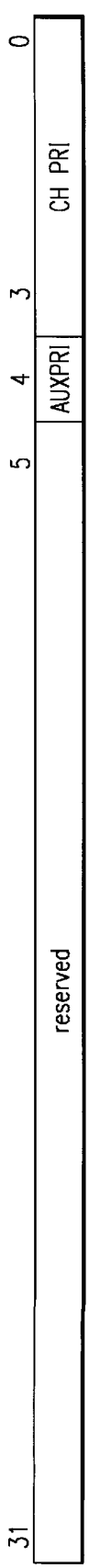
FIG. 14 is an illustration of a DMA channel global control register of the DMA controller of FIG. 4.

FIG. 14 illustrates the DMA Global Control Register which specified Priority Between Channels. The fields in the DMA Global Control Registers affect all DMA channels and are described in Table 9. The fields in this register will be referred to in the following sub-sections.

TABLE 9

DMA Global Control Register

| Bit field | Decription |
|---|---|
| CH PRI | DMA Channel Priority<br>CH PRI=0000b, fixed channel priority mode auxiliary channel 1st highest priority<br>CH PRI=0001b, fixed channel priority mode auxiliary channel 2nd highest priority<br>CH PRI=0010b, fixed channel priority mode auxiliary channel 3rd highest priority<br>CH PRI=0011b, fixed channel priority mode auxiliary channel 4th highest priority<br>CH PRI=0100b, fixed channel priority mode auxiliary channel 5th highest priority<br>CH PRI=other, reserved |
| AUXPRI | Auxiliary Channel Priority Mode<br>AUXPRI=0, CPU priority<br>AUXPRI=1, DMA priority |

The priority between DMA channels determines which DMA channel will perform a read or write transfer first, given that two or more channels are ready to perform transfers.

The priority of the auxiliary channel is configurable by programming the CH PRI field in the DMA Global Control Register. By default, CH PRI=0000b at reset. This sets the auxiliary channel as highest priority, followed by channel 0, followed by channel 1, followed by channel 2, with channel 3 having lowest priority.

Arbitration between channels occurs independently for read and write transfers every CPU clock cycle. Any channel that is in the process of waiting for synchronization of any kind may lose control of the DMA to a lower priority channel. Once that synchronization is received, that channel may regain control of the DMA from a lower priority channel. This rule is applied independently to the transmit and receive portions of a split mode transfer. The transmit portion has higher priority than the receive portion.

If multiple DMA channels and the CPU are contending for a resource, the arbitration for which DMA channel has priority occurs logically first. Then arbitration between the highest priority DMA channel and the CPU occurs. Normally, if a channel is lower priority than the CPU, all lower priority channels should also be lower priority than the CPU. Similarly, if a channel is higher priority than the CPU, all higher priority channels should also be higher priority than the CPU. This arbitration of DMA versus CPU contention is decided by each particular resource. Refer to that resource's documentation for a full explanation. Note that the PRI field should only be modified when that channel is paused or stopped.

A higher priority channel will gain control of the DMA from a lower priority channel once it has received the necessary read synchronization. In switching channels, the current channel allows all data from requested reads to complete. Then the DMA determines which higher priority channel will gain control of the DMA controller read operation. That channel then starts its read operation. Simultaneously, write transfers from the previous channel are allowed to complete.

If multiple DMA channels are contending for the same resource for reads AND writes, then the higher priority channel wins. For example, if channel 0 wants to read from the EMIF and channel 1 wants to write to the EMIF, then the channel 0 reads occur first. If one channel is requesting both reads and writes from/to the same resource, then the writes happen first.

Methods for DMA channel condition determination will now be described. Several conditions are available to inform the user of significant milestones or potential problems in DMA channel operation. These events (indicated by the COND bit fields) are held in the DMA Channel Secondary Control Register.

Figure 15:
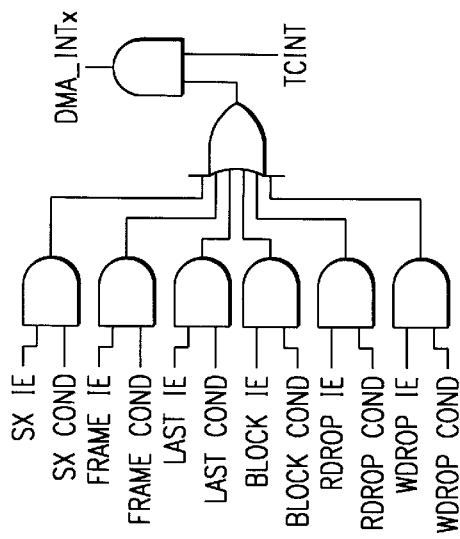
FIG. 15 is a schematic diagram of a circuit to generate a DMA interrupt for a selected channel from various conditions.

This register also provides the means to enable these events to trigger the DMA to CPU interrupt for that channel χ through the corresponding interrupt enable (IE) bit fields. If a COND bit and its corresponding IE bit are set then that condition is enabled to contribute to the status of the interrupt signal the from the associated DMA Channel to the CPU. If the TCINT bit in the DMA Channel χ Control register is set, the logical OR of all enabled conditions forms the DMA_INTχ signal. Otherwise, the DMA_INTχ remains inactive. This logic is shown in FIG. 15. If selected by the interrupt selector, a low to high on that DMA_INT will cause an interrupt condition to be latched by the CPU.

The SX COND, WDROP, and RDROP bits in the DMA Channel Secondary Control Register are treated as warning conditions. If these conditions are enabled and active, then they move the DMA channel from the running to the pause state, regardless of the value of the TCINT bit.

If a COND bit's associated IE bit is set, that COND bit may only be cleared by a user write of 0. Otherwise, that COND bit may be automatically cleared as indicated in the following section. A user write of 1 to a COND bit has no effect. Thus, you cannot manually force one of the conditions.

Most values in this register are cleared at reset. The one exception is the interrupt enable for the block transfer complete event (BLOCK IE), which is set at reset. Thus, by default, the block transfer complete condition is the only condition that could contribute to the CPU interrupt. Other conditions can be enabled by setting the associated IE bit.

Table 10 describes each of the conditions in the DMA Channel Secondary Control Register. Depending on the system application, these conditions may represent errors. As a note, the last frame condition can be used to change the reload register values for auto-initialization. The frame index and element count reload are used every frame. Thus, you must wait until all but the last frame transfer in a block transfer complete to change these values. Otherwise, the current (rather than the next) block transfer will be affected.

TABLE 10

DMA Channel Condition Descriptions

| Bit field | | | COND Cleared By | |
| --- | --- | --- | --- | --- |
| Name | Event | Occurs if . . . | If IE Enabled | Otherwise |
| SX | Split Transmit Overrun Receive | The split operation is enabled and transmit element transfers get seven or more element transfers a ahead of receive element transfers. | A user write of 0 to COND transfers. | |
| FRAME | Frame Complete | After the last write transfer in each frame is written to memory. | A user write of 0 to COND. | Two CPU clocks later. |
| LAST | Last Frame | After all counter adjustments for the next to last frame in a block transfer complete. | A user write of 0 to COND. | Two CPU clocks later. |
| WDROP RDROP | Dropped Read/Write Synchronization | A subsequent synchronization event occurs before the last one is cleared. | A user write of 0 to COND. | |
| BLOCK | Block Transfer Complete | After the last write transfer in a block transfer is written to memory. | A user write of 0 to COND. | Two CPU clocks later. |

Figure 16:
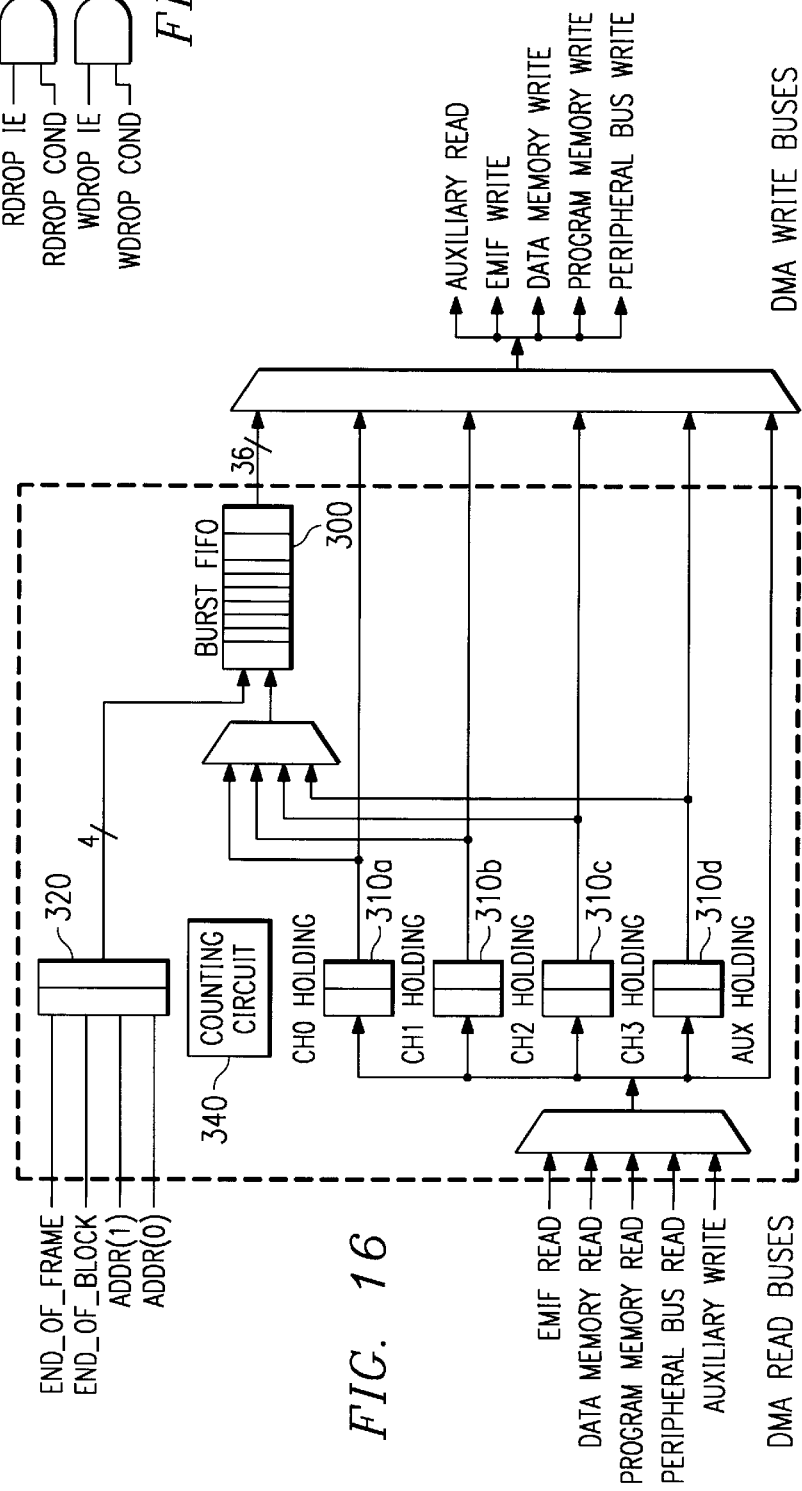
FIG. 16 is a block diagram of a DMA controller data bus for the DMA controller of FIG. 4.

FIG. 16 shows the internal data movement paths of the DMA controller including data buses and internal holding registers.

Each DMA channel can independently select one of four sources and destinations:

1) EMIF 103
2) Internal Program Memory 23
3) Internal Data Memory 22
4) Internal Peripheral Bus 110

Thus, read and write buses are provided from each interface to the DMA controller.

The auxiliary channel also has read and write buses. However, as the auxiliary channel provides address generation for the DMA the naming convention of its buses differ. For example, data writes from the auxiliary channel through the DMA are performed through the Auxiliary Write Bus. Similarly, data reads from the auxiliary channel through the DMA are performed through the Auxiliary Read Bus.

An aspect of the present invention is a 9-deep DMA FIFO 300 holding path that is provided to facilitate bursting to high performances memories including internal program and data memory as well as external synchronous DRAM (SDRAM) or synchronous burst SRAM (SBSRAM). When combined with a channel's holding registers 310*a*, 310*b*, 310*c* or 310*d*, this effectively becomes an 11-deep FIFO.

There are actually three components to the FIFO:
1) An address FIFO 320 which stores the two LSBs of the read address and the end_of_frame and end_of_block status at the time of a read advance cycle.
2) A 36-bit wide data FIFO 300 which stores the 32-bit read data word along with the data coming out of the address FIFO due to read acknowledgements,
3) A two-deep intermediate stage 310a–310d that stores data coming out of the address stage before it goes to the data FIFO which is required because of the two-cycle acknowledgement to read data latency.

During the ten read advance cycles before any write advances, read acknowledgements begin. These acknowledgements start removing data from the address FIFO 320 and placing them in the data FIFO 300 along with read data. Thus, the data items are distributed across the three stages. There is counting logic 340 that tracks the number of items stored in each stage.

At any one time only one channel controls the FIFO. For a channel to gain control of the FIFO, the following conditions must all apply:
1) The channel has no read or write synchronization enabled. Since split mode requires read and write synchronization, the FIFO is not used by a channel in split mode. Note that if only frame synchronization is enabled then the FIFO may still be used by that channel.
2) The channel is running.
3) The FIFO is void of data from any other channel.
4) The channel is the highest priority channel of those that meet the above three conditions.

The third restriction minimizes "head-of-line" "blocking". Head-of-line blocking occurs when a DMA request of higher priority waits for a series of lower priority requests to come in before issuing its first request. If a higher priority channel requests control of the DMA controller from a lower priority channel, only the last request of the previous channel has to complete. After that, the higher priority channel completes its requests through its holding registers. The holding registers do not allow as high a throughput through the DMA controller. In the gaps, the lower priority channel begins no more read transfers but is allowed to flush the FIFO by completing its write transfers. As the higher priority channel is not yet in control of the FIFO, there will be gaps in its access where the lower priority channel may drain its transfer from the FIFO. Once the FIFO is clear, if the higher priority channel has not stopped, it gains control of the FIFO.

The DMA FIFO has two purposes:
1) Increased Performance
2) Decreased Arbitration Latency Increased Performance: The FIFO allows read transfers to get ahead of write transfers. This feature minimizes penalties for variations in available transfer bandwidth at either end of the element transfer. Thus, the DMA can capitalize on separate windows of opportunity at the read and write portion of the element transfer. If the requesting DMA channel is using the FIFO, the resources are capable of sustaining read or write accesses at the CPU clock cycle rate. However, there may be some latency in performing the first access. The handshaking between the resource and the DMA Controller controls the rate of consecutive requests and the latency of received read transfer data.

To sustain read and write accesses at the CPU clock rate, the FIFO cannot be filled. To avoid filling the FIFO, data must begin being written out of the FIFO before read requests place data in the last empty FIFO location. From the peripheral handshaking operation, we have determined that a fifo depth of eleven words is required. Thus, at any point in time, the DMA may have up to eleven read transfers in the FIFO queued for their write transfers to complete.

Decreased Arbitration Latency versus the CPU: To capture read data from any pending requests for a particular resource. For example, consider the situation where the DMA is reading data from pipelined external memory such as SDRAM or SBSRAM to internal data memory. Assume the CPU is given higher priority over the DMA channel making requests and that it makes a competing program fetch request of the EMIF. Also, assume that simultaneously, the CPU is accessing all banks of internal memory, blocking out the DMA. In this case, the FIFO allows the pending DMA accesses to complete and the program fetch to proceed. Due to the pipelined request structure of the DMA, at any one point in time the DMA may have up to eleven pending read transfer requests whose data has not yet arrived. Once eleven requests are outstanding, the DMA stops making subsequent read transfer requests.

Each channel has dedicated internal holding registers. If a DMA channel is transferring data through its holding registers rather than the internal FIFO, read transfers are issued consecutively. Once a read transfer request has been initiated, no subsequent read transfer is started until the read data has arrived within the holding register. Depending whether the DMA controller is in split mode or not additional restrictions can apply:

1) Split Mode: The two registers serve as separate transmit and receive data stream holding registers for split mode. For either the transmit or receive read transfer, no subsequent read transfer request is issued until the associated write transfer request completes.
2) Non-Split Mode: However, when not in split mode, once the data arrives a subsequent read transfer may be issued without waiting for the associated write transfer to complete. However, because there two holding registers, read transfers may only get one ahead of write transfers.

Using the described structure, the DMA can perform element transfers with single cycle throughput, if it accesses separate resources for the read transfer and write transfer and both these resources have single-cycle throughput. An example would be an unsynchronized block transfer from single-cycle external SBSRAM to internal data memory without any competition from either other channels or the CPU. The DMA performance can be limited by:
1) The throughput and latency of the resources it requests.
2) Waiting for read, write, or frame synchronization.
3) Contention for resources for other DMA channels.

Referring again to FIG. 4, DMA Action Complete Pins, DMAC (0–3), will now be described. The DMA Action Complete pins provide a method of feedback to external logic generating an event for each channel (DMAC0–DMAC3). As decided by the DMAC EN bit field in the DMA Channel Secondary Control register, this pin can reflect the status of RSYNC STAT, WSYNC STAT, BLOCK COND, or FRAME COND, or be treated as a high or low general purpose output. If DMAC reflects RSYNC STAT or WSYNC STAT, externally, once a synchronization event has been recognized DMAC will transition from low to high. Once that same event has been serviced (as indicated by the status bit being cleared), DMAC transitions from high to low. Before being sent off chip the DMAC signals are synchronized by CLKOUT2 (½ the CPU clock rate). The active period of these signals is guaranteed to be a minimum of 2 CLKOUT2 periods wide. Also, even if before synchronization the pulses are only 1 CPU clock period wide, a minimum 2 CLKOUT period active-high pulse occurs on the DMAC pin.

Referring again to FIG. 1A, during debug using an emulator in test system 51, the CPU may be halted on an execute packet boundary for single stepping, benchmarking, profiling, or other debug uses. The user may configure whether the DMA pauses during this time or continues running. This function is performed by setting the EMOD bit in the DMA Primary Control register to 0 or 1, respectively. If paused, the STATUS field will reflect the pause state of the channel. The auxiliary channel continues running during an emulation halt. U.S. Pat. No. 08/974,742 TI-24946) describes emulation of microprocessor 1 in complete detail, and has been incorporated herein by reference.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other functional circuitries which are combined with the functional circuitries disclosed herein in order to reduce the total gate count of the combined functions. Since those skilled in the art are aware of techniques for gate minimization, the details of such an embodiment will not be described herein.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A data processing device, comprising:

a central processing unit (CPU) operable to execute software instructions stored in a program memory circuit connected to the central processing unit;

a data memory circuit operable to store data to be processed by the processing device; and a direct memory access (DMA) controller having a plurality of DMA channels, wherein each DMA channel has associated programmable read address circuitry and programmable write address circuitry, each DMA channel operable to transfer data from or to the data memory circuit, the DMA controller comprising:

a FIFO buffer connected to a data bus to receive a plurality of data elements received in response to the read address circuitry associated with a selected one of the plurality of DMA channels, the FIFO buffer operable to hold a portion of the plurality of data elements until the portion of the plurality of data elements is written in response to the write address circuitry of the selected one of the plurality of DMA channels; and wherein the FIFO buffer is operable to be selectively associated with any one of the plurality of DMA channels, such that non-selected ones of the plurality of DMA channels are operable to transfer data from or to the data memory without use of the FIFO.

2. The data processing device of claim 1, wherein a first channel of the plurality of DMA channels is selected to be associated with the FIFO in response to a first channel priority of the first channel being higher than a channel priority of any other of the plurality of channels.

3. The data processing device of claim 2, wherein a second channel of the plurality of DMA channels is selected to be associated with the FIFO in response to a second channel priority of the second channel becoming higher than the first channel priority while the first channel is transferring data, such that the first channel is then operable to transfer data from or to the data memory without use of the FIFO.

* * * * *